Figure 1:
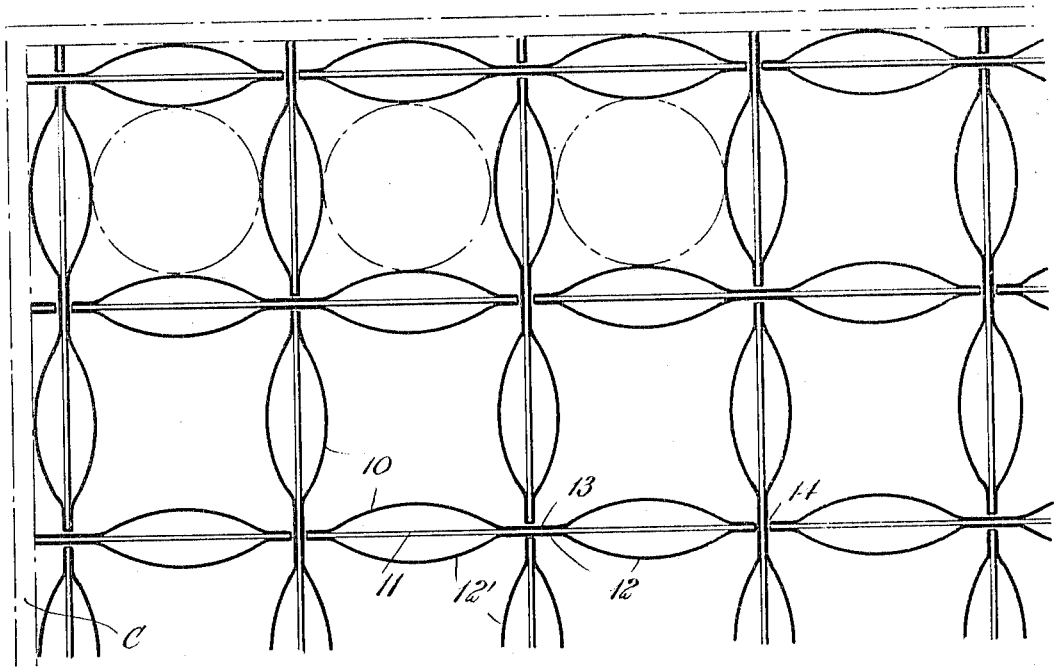

I. V. BOWLEY.
EGG CARRIER.
APPLICATION FILED OCT. 8, 1913.

1,105,398.

Patented July 28, 1914.

WITNESSES
Edw. Thorpe
Geo. L. Beeler

INVENTOR
Isaac V. Bowley
BY Munn & Co
ATTORNEYS

UNITED STATES PATENT OFFICE.

ISAAC VINCEN BOWLEY, OF WHITEROCK, MAINE.

EGG-CARRIER.

1,105,398.  Specification of Letters Patent. Patented July 28, 1914.

Application filed October 8, 1913. Serial No. 794,090.

*To all whom it may concern:*

Be it known that I, ISAAC V. BOWLEY, a citizen of the United States, and a resident of Whiterock, in the county of Cumberland and State of Maine, have invented a new and Improved Egg-Carrier, of which the following is a full, clear, and exact description.

This invention relates to packing or shipping receptacles and has particular reference to partitions or fillers for receptacles intended for the transportation of eggs, bottles, electric light bulbs or other frangible articles.

Among the objects of the invention, therefore, is to provide a filler of a simple, cheap and reliable nature for the purposes set forth.

The foregoing and other objects of the invention will hereinafter be more fully described and claimed and illustrated in the drawings forming a part of this specification in which like characters of reference indicate corresponding parts in both the views, and in which—

Figure 2:
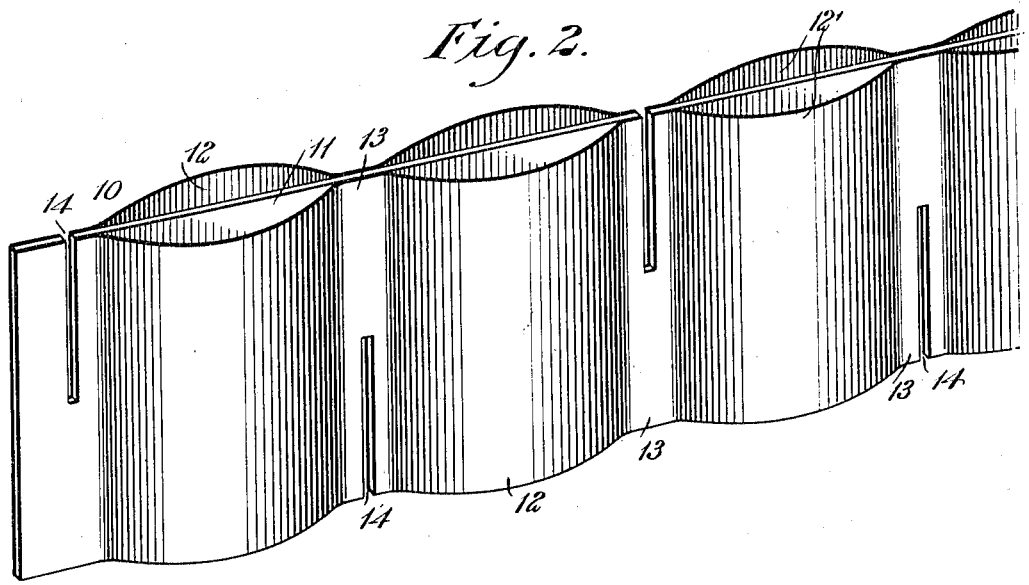

Figure 1 is a plan view of a portion or fragment of a filler construction made in accordance with this invention and showing its relation to the side walls of the crate, the latter being indicated in broken lines; and Fig. 2 is a perspective view of a portion of one element of the filler.

The several parts of the device may be made of any suitable materials, such as celluloid, vulcanized rubber, cardboard, or the like, and the relative sizes and proportions, as well as the general design of the mechanism, may be varied to a considerable extent without departing from the spirit of the invention hereinafter more fully set forth and specifically claimed.

A device made in accordance with this invention comprises preferably a plurality of elements 10 arranged preferably at right angles to one another and so interlocked as to be normally held together so as to constitute a complete filler for a series of articles such as eggs to be carried individually in the cells formed by the combination of the elements referred to. Each of said elements 10 is made up preferably of a rib 11 of some suitable flat comparatively thin but stiff material and of a length corresponding to the inside dimensions of the crate C with which the device is to be used, and of a width or height corresponding to the maximum dimension of the articles to be packed or carried in the filler. On either side of the rib 11 is arranged a comparatively thin and somewhat flexible strip 12, the same being secured to the rib at regularly spaced intervals and thereby forming reinforcement sections 13 extending vertically or transversely of the filler element. These parts may be secured together in any suitable manner as, for instance, by the use of glue or cement. The strip 12 between each two adjacent sections 13 is looped as shown at 12', thereby forming a series of flexible cushions operative between the articles being carried and the rib 11.

Each of the sections 13 of the combined rib and cushioning strips is slitted at 14 substantially one half way across the filler element 10, or one half the length of such section, and the slits 14 are preferably arranged in inverse relation each to each throughout the element. The glue being applied at the reinforcement 13 over sufficient space to secure the several parts on each side of the slit, the slitting does not seriously weaken the device as a whole and does not interfere with the proper cushioning strength of the cylindrical cushioning strip sections 12', the ends of each of such cylindrical sections being connected securely to the rib independently of the slits. The arrangement of the slits in staggered or inverse relation makes it possible for the filler to be lifted as a whole by grasping any two of the elements without danger of separation of such elements.

Having thus described my invention, I claim as new and desire to secure by Letters Patent:—

1. In an egg carrier, a filler consisting of a plurality of elements, each element comprising a flat stiff rib and a cushioning strip secured at regularly spaced intervals to one side of the rib, the sections of the strip between the places of connection with the rib being formed into convex cushions, and said element being slitted along said places of connection between the strip and the rib, the connection places being operative on each side of the slits and independently thereof, substantially as and for the purposes set forth.

2. In an egg carrier, the combination of a series of filler elements arranged angularly to one another, each of said elements comprising a stiff flat rib and flexible cushioning strips secured upon opposite sides of the rib, said strips being secured along vertically arranged oppositely disposed planes to said rib and the sections thereof between such planes of connection being formed into convex flexible sections spaced from the rib, the planes of connection aforesaid constituting reinforcements or stiffeners for the element and each of said reinforcements being slitted from the end thereof inwardly through substantially one half its length whereby the several elements are connected together.

In testimony whereof I have signed my name to this specification in the presence of two subscribing witnesses.

ISAAC VINCEN BOWLEY.

Witnesses:
HIRAM W. ESTY,
FREDERICK L. JERRIS.